(12) United States Patent
Sasaki

(10) Patent No.: US 7,963,374 B2
(45) Date of Patent: Jun. 21, 2011

(54) POWER-OFF ELECTROMAGNETIC BRAKE

(75) Inventor: Kozo Sasaki, Nagano-ken (JP)

(73) Assignee: Harmonic Drive Systems Inc., Tokyo (JP)

( * ) Notice: Subject to any disclaimer, the term of this patent is extended or adjusted under 35 U.S.C. 154(b) by 855 days.

(21) Appl. No.: 12/001,125

(22) Filed: Dec. 10, 2007

(65) Prior Publication Data

US 2008/0156597 A1  Jul. 3, 2008

(30) Foreign Application Priority Data

Dec. 28, 2006 (JP) .................. 2006-355958
Jun. 8, 2007 (JP) .................. 2007-152195

(51) Int. Cl.
*B60T 13/04* (2006.01)

(52) U.S. Cl. ......... 188/171; 188/161; 361/152; 361/154

(58) Field of Classification Search .................. 188/171, 188/173, 161, 162, 164, 158, 157, 156; 701/70, 701/83; 361/152, 154, 159

See application file for complete search history.

(56) References Cited

U.S. PATENT DOCUMENTS

| | | | | |
|---|---|---|---|---|
| 4,458,290 A | * | 7/1984 | Miyashita | 361/152 |
| 5,235,303 A | * | 8/1993 | Xiao | 335/132 |
| 6,650,113 B2 | * | 11/2003 | Sekiya | 324/258 |
| 6,925,975 B2 | * | 8/2005 | Ozawa et al. | 123/90.11 |

FOREIGN PATENT DOCUMENTS

| | | |
|---|---|---|
| JP | 2000-304073 | 10/2000 |
| JP | 2001-349358 | 12/2001 |

* cited by examiner

*Primary Examiner* — Pam Rodriguez

(74) *Attorney, Agent, or Firm* — Flynn, Thiel, Boutell & Tanis, P.C.

(57) ABSTRACT

The power-off electromagnetic brake (2) attracts an armature that is pressed by a spring force to a rotating member by a magnetic attraction force that is generated by energizing an exciting coil, and brake force that is acting on the rotating member is released. A voltage control circuit (12) continuously energizes the exciting coil for a fixed length of time and generates a considerable magnetic attraction force in order to attract the armature to a yoke when a brake power source (14) is switched on during brake release. After the armature has been attracted to the yoke, the voltage control circuit (12) intermittently energizes the exciting coil at a set cycle and a set on/off duty ratio to hold the armature in an attracted state to the yoke, thereby reducing power consumption and heat generation.

3 Claims, 2 Drawing Sheets

POWER-OFF ELECTROMAGNETIC BRAKE

TECHNICAL FIELD

The present invention relates to a power-off electromagnetic brake in which power loss for holding a brake in a release state is reduced and heat generation is decreased.

BACKGROUND ART

In a power-off electromagnetic brake used in servomotors and the like, an armature is urged toward the rotating shaft of a motor by a spring force and brake force operates in an unexcited state. When excited, the armature is attracted toward the yoke by magnetic attraction force, and the brake force operating on the rotating shaft of the motor is released. A considerable amount of power is required when the armature is attracted to the yoke, but the power required to hold the armature in an attracted state after the armature has been attracted to the yoke can be a small amount. In other words, the power for maintaining the attracted/held state of the armature that is used for holding a brake-free state can be a small amount.

In Patent Document 1, two sets of exciting coils of a power-off electromagnetic brake are connected in series. One of the sets of exciting coils is used as a low-resistance coil for momentary attraction through which a large electric current flows for a short interval of time at the start of brake release, and the other set of exciting coils is used as a high-resistance holding coil in which a small electric current flows for holding the armature over a long period of time after attraction, whereby unnecessary electric current is prevented from flowing when the brake is in a released state. In Patent Document 2, a rectifier circuit, which is used for obtaining a DC power source from an AC power source in an electromagnetic brake used in an AC induction motor, is used to briefly send a full-wave rectified direct current to the coil winding of an electromagnetic brake when the armature is attracted. The rectifier circuit is configured to send half-wave rectified direct current after armature attraction, and the power that is supplied after the armature of the electromagnetic brake has been attracted is made to be less than the power that is supplied during attraction.

Patent Document 1 JP-A 2000-304073
Patent Document 2 JP-A 2001-349358

With the electromagnetic brake disclosed in Patent Document 1, the structure cannot be reduced in size because two exciting coils are provided and the cost is high. With the electromagnetic brake disclosed in Patent Document 2, the use of an AC power source is presumed, and the brake does not adequately function with direct current that has been subjected to half-wave rectification when the torque startup time of the brake is shorter than ½ the power source frequency.

DISCLOSURE OF THE INVENTION

An object of the present invention is to provide a power-off electromagnetic brake that can solve the problems described above.

In order to solve the problems described above, the present invention is directed to a power-off electromagnetic brake in which an armature that is pressed to a rotating member by a spring force is attracted to a yoke by an electromagnetic attraction force generated by the energizing of an exciting coil, and a brake force operating on the rotating member is released, the brake characterized in comprising:

switching signal generation means for generating a switching signal that switches on and off at a prescribed cycle and a prescribed duty ratio;

continuous energizing means for continuously energizing the exciting coil with a direct current at a constant voltage for a fixed length of time in order to attract the armature to the yoke when the brake power is switched on; and intermittent energizing means for intermittently energizing the exciting coil with a direct current at a constant voltage using the switching signal in order to hold a brake release state in which the armature is attracted to the yoke after a fixed length of time has elapsed.

A constant voltage is applied uninterrupted to the exciting coil until the armature is attracted to the yoke after the brake power source has been switched on. Power consumption can be reduced by continuously switching the applied voltage on and off and reducing the average voltage in order to switch over to an attraction holding state after the armature has been attracted to the yoke. As a result, power loss in the armature attraction holding state can be reduced and heat generation can be decreased.

Here, the power-off electromagnetic brake of the present invention preferably comprises a momentary stoppage power circuit for supplying power when the brake power supply has been momentarily stopped; and a momentary stoppage detection circuit for carrying out the continuous energizing by the continuous energizing means when a stop duration in which the duration of the momentary stop of the brake power supply determined in advance is exceeded, wherein the stop duration is shorter than the duration in which the armature is released from the yoke.

The armature may be released from the yoke when the momentary stoppage of the brake power source occurs in the armature attraction holding state. The armature attraction holding state can be maintained without affecting the momentary stoppage as long as the stop duration of the momentary stoppage is less than the stop duration required to release the armature. The armature attraction holding state cannot be maintained and the armature is released if the stop duration of the momentary stoppage is greater than the stop duration required to release the armature. With the present invention, continuous energizing is carried out by a continuous energizing means and an attraction operation for attracting the armature to the yoke is carried out when a momentary stoppage occurs that is longer than the stop duration that is required to release the armature. The armature attraction holding state can thereby be maintained regardless of the existence of a momentary stoppage.

Next, in the power-off electromagnetic brake of the present invention, it is preferred that a rectifier circuit for generating a direct current from the AC brake power source be included when the brake power source is an AC brake power source.

With the power-off electromagnetic brake of the present invention, the exciting coil is continuously energized and a large magnetic attraction force is temporarily generated when the armature is attracted to the yoke. The exciting coil is intermittently energized at a prescribed cycle and a prescribed duty ratio so that the voltage required to hold the state in which the armature has been attracted to the yoke is applied after the armature has been attracted to the yoke.

The period and duty ratio of the excitation electric current for holding the armature in an attracted state is suitably set, whereby power loss in the brake release state of the electromagnetic brake can be reduced and the generation of heat can be prevented. The on/off period of the excitation electric current is suitably set, whereby the torque startup time of the brake can be made to function even when the torque startup time of the brake is shorter than ½ the power source frequency.

An effect can be achieved in which the armature attraction holding state can be maintained without being affected by the existence of a momentary stoppage in situations in which continuous energizing is carried out and the armature is re-attracted to the yoke in the case that the momentary stoppage time is considerable when the brake power source is momentarily stopped.

BEST MODE FOR CARRYING OUT THE INVENTION

Embodiments of a power-off electromagnetic brake to which the present invention has been applied are described below with reference to the diagrams. The basic configuration of the mechanism portion of the power-off electromagnetic brake is the same as that of a commonly used brake. The configuration is provided with a disc that integrally rotates with the rotating shaft of a motor, an armature (friction plate) mounted on the disk via spring force, and an electromagnet composed of a yoke and exciting coil. In a power-off state, brake force operates on the rotating shaft of a motor via spring force. Brake force is released when the armature is attracted to the yoke against the spring force by the magnetic attraction force that is generated when the exciting coil is energized.

Figure 1:
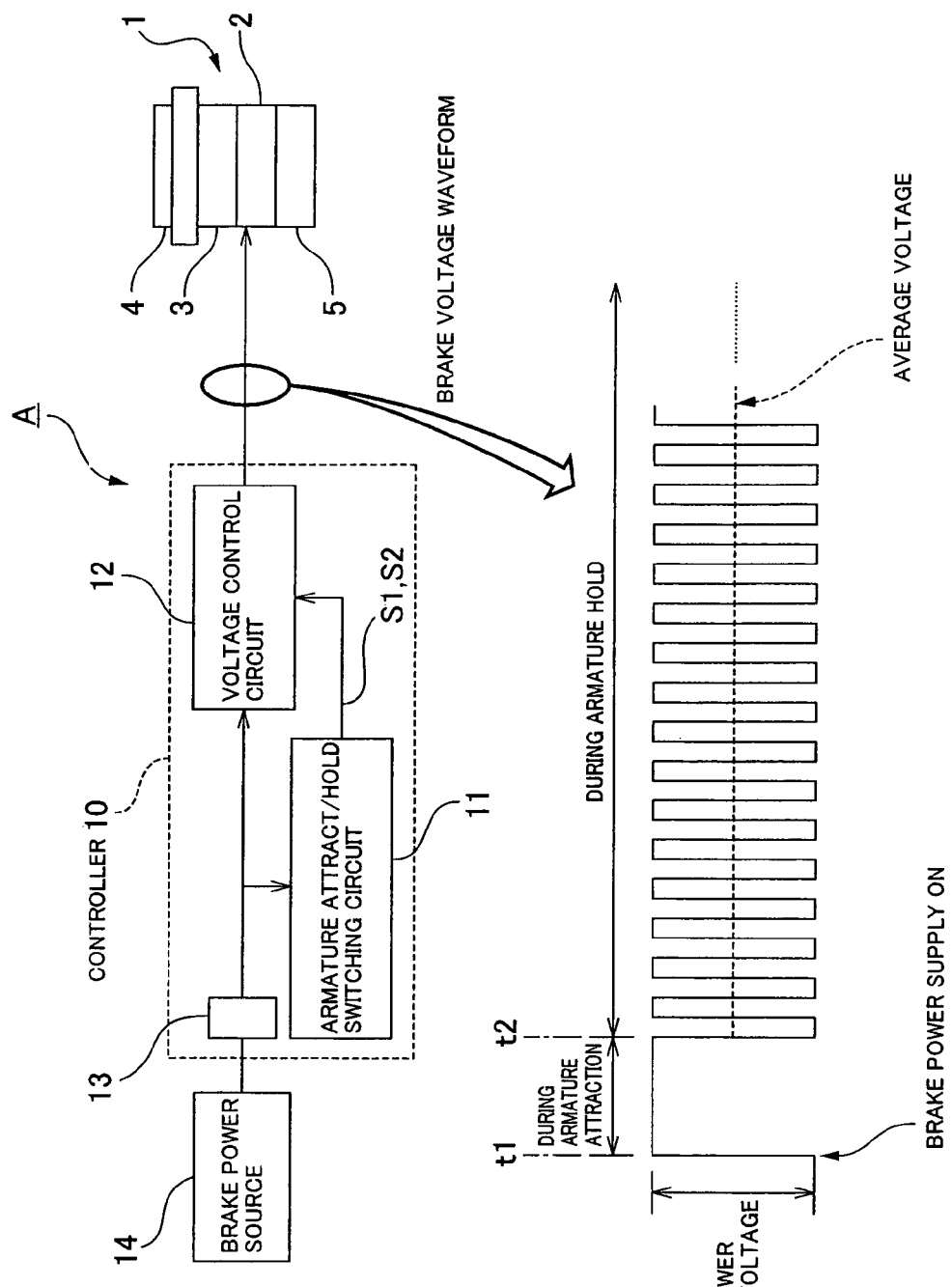
FIG. 1A is a schematic structural diagram showing a drive system provided with a power-off electromagnetic brake to which the present invention has been applied.
FIG. 1B is a voltage waveform diagram of the excitation electric current.

FIG. 1A is an overall structural diagram showing a drive system provided with a power-off electromagnetic brake. The drive system A has an armature 1 and a power-off electromagnetic brake 2 mounted on the armature. The armature 1 is provided with a motor 3, a reduction gear 4 mounted on the front end side of the motor 3, and an encoder 5 mounted on the rear end side of the motor 3. The power-off electromagnetic brake 2 is positioned between the motor 3 and the encoder 5 on the rear end side portion of the rotating shaft (not shown) of the motor.

A controller 10 of the power-off electromagnetic brake 2 is provided with an armature attract/hold switching circuit 11, a voltage control circuit 12, and a power circuit 13. The AC current that is supplied from an external brake power source 14 and that is used to release the brake passes through a power circuit 13 is converted to a constant-voltage DC current and is supplied to the circuits 11 and 12.

The armature attract/hold switching circuit 11 presents the voltage control circuit 12 with a signal S1 for use during armature attraction that lasts for a preset fixed length of time when the brake power source 14 is switched on. After the fixed length of time has elapsed, a signal S2 for armature holding is supplied to the voltage control circuit 12.

The voltage control circuit 12 continuously energizes the exciting coil of the power-off electromagnetic brake 2 using a direct current at a constant voltage during the interval in which the signal S1 for use during armature attraction is being supplied, and generates the magnetic attraction force required to attract the armature to the yoke against the spring force. The voltage control circuit 12 intermittently energizes the exciting coil at a prescribed cycle and a prescribed duty ratio when the signal S2 for armature holding is supplied, and generates the magnetic attraction force that is required to hold the armature attracted to the yoke.

FIG. 1B shows an example of a voltage waveform of an exciting electric current supplied from the voltage control circuit 12 to the exciting coil. As shown in the diagram, when the brake power source 14 is switched on and the brake DC power voltage of the power circuit 13 is switched on (time t1), an electric current having a constant voltage is supplied and the armature is attracted and made to adhere to the yoke under a considerable magnetic attraction force for the time, e.g. 100 ms, required to attract the armature to the yoke and release the brake force (from time t1 to time t2). Thereafter, an exciting electric current having a prescribed cycle and a prescribed duty ratio, e.g., 14 kHz and an on-duty ratio of 40%, is sent to the exciting coil, generating a magnetic attraction force required for maintaining a state in which the armature is attracted and held to the yoke. The average value of the applied voltage is reduced by carrying out such intermittent energizing, and the supply of power can be reduced to a required power level.

Figure 2:
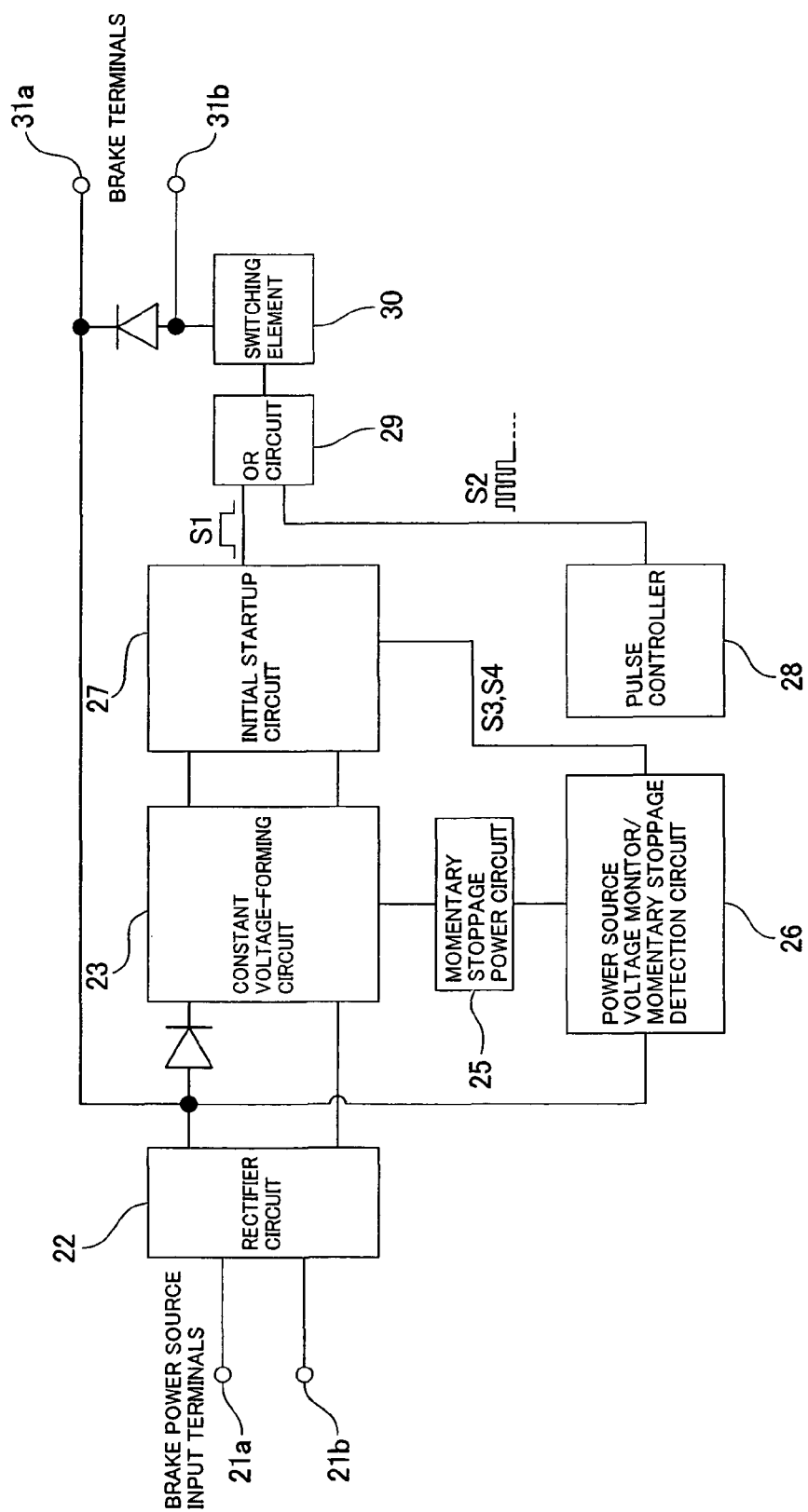
FIG. 2 is a circuit block diagram of the controller of the power-off electromagnetic brake of FIG. 1.

FIG. 2 is a circuit block diagram of the controller 10. In reference to the diagram, the power circuit 13 of the controller 10 subjects the AC current supplied via the brake power source input terminals 21a and 21b to full-wave rectification via a rectifier circuit 22 that is composed of a diode bridge circuit. A constant-voltage direct current (e.g., 5V) for driving the brake is thereafter generated via a constant voltage-forming circuit 23. The armature attract/hold switching circuit 11 is provided with a momentary stoppage power circuit 25, a power source voltage monitor/momentary stoppage detection circuit 26, an initial startup circuit (signal generator for use during attraction) 27, a pulse controller (switching signal generator) 28, and an OR circuit 29.

The power source voltage monitor/momentary stoppage detection circuit 26 monitors the on and off state of the brake power source, and a signal S1 for use during attraction is outputted from the initial startup circuit 27 for a fixed length of time when the brake power source 14 is switched on. The pulse controller 28 outputs a switching signal (hold signal) S2 that has a set cycle and a set duty ratio. The signal S1 for use during attraction and the switching signal S2 are supplied to the OR circuit 29.

The voltage control circuit 12 is provided with a switching element 30. The switching element 30 is driven/controlled by the output signal of the OR circuit 29. Electric current having a constant voltage is supplied to the exciting coil during armature attraction, as shown in FIG. 1B, via the brake terminals 31a and 31b, and a pulsed direct current is supplied to the exciting coil by the switching action produced by the switching element 30 after attraction.

Here, the power source voltage monitor/momentary stoppage detection circuit 26 receives power from the momentary stoppage power circuit 25 and operates to detect the momentary stoppage of the brake power source 14 and to time the duration of the momentary stoppage. A re-attract request signal S3 is outputted to the initial startup circuit 27 when the duration of the momentary stoppage has exceeded a preset duration. This duration is set to be shorter than the duration of required for releasing the armature from the yoke.

The initial startup circuit 27 outputs the signal S1 for use during attraction when the re-attract request signal S3 is received. As a result, the energizing of the exciting coil is switched from intermittent energizing to continuous energizing at a constant voltage, a considerable magnetic attraction force required for attracting the armature is generated, and the armature is re-attracted to the yoke.

The power source voltage monitor/momentary stoppage detection circuit 26 outputs a restart signal S4 to the initial startup circuit 27 when the duration of the momentary stoppage has exceeded the time for which power can be supplied by the momentary stoppage power circuit 25. The restart signal causes the initial startup circuit 27 to return to the state that existed prior to the brake power source being switched on. The signal S1 for use during armature attraction is outputted when the power source has been switched on again after the momentary stoppage, and the armature is attracted to the yoke.

As described above, with the power-off electromagnetic brake 2 according to the present embodiment, a direct current having a constant voltage is generated via the rectifier circuit 22 and the constant voltage-forming circuit 23 when the brake power source 14 is switched on, the initial startup circuit 27 is actuated by the direct current, and a high-level signal S1 for use during attraction is continuously outputted to the OR circuit 29 for the entire set time (from time t1 to time 2t in FIG. 1(b)). As a result, the armature attraction operation is carried out for attracting the armature to the yoke against the spring force. Thereafter, the signal S1 for use during attraction of the initial startup circuit 27 becomes a low-level signal, and the output of the OR circuit 29 is switched to the switching signal S2 from the pulse controller 28. As a result, the switching element 30 repeatedly switches on and off, and the armature attract/hold state is maintained in a state in which the power supplied to the exciting coil is reduced. Power loss in the armature attract/hold state (brake release state) can thereby be lowered and heat generation can be reduced.

Here, in the brake release state, the attract/hold state of the armature is not liable to be released when a momentary stoppage has been generated for a shorter duration than the time for releasing the armature. Therefore, the intermittent energizing brought about by the switching signal S2 is continued. In contrast, the power source voltage monitor/momentary stoppage detection circuit 26 is actuated by the momentary stoppage power circuit 25 when a momentary stoppage has been generated that is longer than the time for releasing the armature, and the re-attract request signal S3 is outputted to the initial startup circuit 27. As a result, a high-level signal S1 for use during armature attraction is outputted from the initial startup circuit 27 and the armature is re-attracted to the yoke. The armature attract/hold state (brake release state) can thereby be maintained even if a momentary stoppage occurs.

With the controller 10 of the present example, a direct current for driving the brake is generated from an AC current by using a rectifier circuit 22 composed of a diode bridge circuit, but it is also possible to directly use the brake power source a direct current power source in which the voltage fluctuation is within 20% or to use a direct current that has been subjected to full-wave rectification. Also, the controller 10 is incorporated into the power-off electromagnetic brake, but the controller 10 may also be housed in the motor 3 or mounted outside of the motor 3.

The invention claimed is:

1. A power-off electromagnetic brake in which an armature that is pressed to a rotating member by a spring force is attracted to a yoke by an electromagnetic attraction force generated by energizing an exciting coil and a brake force operating on the rotating member is released, the brake comprising:
   a brake power supply;
   switching signal generation means for generating a switching signal that switches on and off at a prescribed cycle and a prescribed duty ratio;
   continuous energizing means for continuously energizing said exciting coil with a direct current at a constant voltage for a fixed length of time in order to attract said armature to said yoke when said brake power supply is switched on; and
   intermittent energizing means for intermittently energizing said exciting coil with a direct current at said constant voltage using said switching signal in order to hold a brake release state in which said armature is attracted to said yoke after a fixed length of time has elapsed.

2. The power-off electromagnetic brake of claim 1, wherein said brake power supply is an AC brake power source, and further comprising a rectifier circuit for generating a direct current from the AC brake power source.

3. A power-off electromagnetic brake in which an armature that is pressed to a rotating member by a spring force is attracted to a yoke by an electromagnetic attraction force generated by energizing an exciting coil and a brake force operating on the rotating member is released, the brake comprising:
   a brake power supply;
   a momentary stoppage power circuit for supplying power when said brake power supply has been momentarily stopped;
   switching signal generation means for generating a switching signal that switches on and off at a prescribed cycle and a prescribed duty ratio;
   continuous energizing means for continuously energizing said exciting coil with a direct current at a constant voltage for a fixed length of time in order to attract said armature to said yoke when said brake power supply is switched on;
   a power supply voltage monitor/momentary stoppage detection circuit for carrying out said continuous energizing by said continuous energizing means when a stop duration in which the duration of the momentary stop of said brake power determined in advance is exceeded, the stop duration being shorter than the duration in which said armature is released from said yoke; and
   intermittent energizing means for intermittently energizing said exciting coil with a direct current at said constant voltage using said switching signal in order to hold a brake release state in which said armature is attracted to said yoke after a fixed length of time has elapsed.

* * * * *